US008520229B2

(12) United States Patent
Kusakabe

(10) Patent No.: US 8,520,229 B2
(45) Date of Patent: Aug. 27, 2013

(54) METHOD FOR ACQUIRING USER IDENTIFICATION INFORMATION OF DESTINATION APPARATUS UNDER WSD PROTOCOL BEFORE SENDING READ IMAGE DATA

(75) Inventor: Taketoshi Kusakabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 647 days.

(21) Appl. No.: 12/619,618

(22) Filed: Nov. 16, 2009

(65) Prior Publication Data

US 2010/0123920 A1    May 20, 2010

(30) Foreign Application Priority Data

Nov. 18, 2008  (JP) ................................. 2008-294595

(51) Int. Cl.
*G06K 15/00* (2006.01)

(52) U.S. Cl.
USPC ......... 358/1.14; 358/1.15; 709/217; 709/223; 709/245

(58) Field of Classification Search
USPC ................ 358/1.14, 1.15; 709/217, 223, 245
See application file for complete search history.

(56) References Cited

U.S. PATENT DOCUMENTS

| 2006/0256392 | A1* | 11/2006 | Van Hoof et al. ............. 358/402 |
| 2007/0121148 | A1* | 5/2007 | Sugimoto et al. ............ 358/1.15 |
| 2007/0208863 | A1* | 9/2007 | Otsuka et al. ................. 709/227 |
| 2008/0168440 | A1* | 7/2008 | Regnier et al. ................ 718/100 |
| 2009/0083439 | A1* | 3/2009 | Matsuda ....................... 709/245 |

FOREIGN PATENT DOCUMENTS

| JP | 2007-219956 | 8/2007 |
| JP | 2008-034923 | 2/2008 |

* cited by examiner

*Primary Examiner* — Jacky X Zheng
(74) *Attorney, Agent, or Firm* — Canon USA Inc. IP Division

(57) ABSTRACT

In a push scan of a web services on devices (WSD) scan service, an information terminal apparatus performs a registration request to receive a service from a reading apparatus. A name of the information terminal apparatus is included in the registration request command, and a user can select the name of the information terminal apparatus as a destination of scan data when executing the push scan from the reading apparatus. However, at this point of time, a user name which is logging on the information terminal apparatus cannot be recognized. For this reason, a requisition command of an operation start request is issued to the information terminal apparatus on a network before the information terminal apparatus as a destination of image data is selected through a display unit of the reading apparatus. Therefore, a log-on user name extracted from a command including the log-on user name transmitted from the information terminal apparatus can be displayed on the display unit.

12 Claims, 9 Drawing Sheets

FIG.9

| DESTINATION SELECTION | |
|---|---|
| PC NAME | LOG-ON NAME |
| PC-A | Taro |
| PC-B | Jiro |
| PC-C | Saburo |

METHOD FOR ACQUIRING USER IDENTIFICATION INFORMATION OF DESTINATION APPARATUS UNDER WSD PROTOCOL BEFORE SENDING READ IMAGE DATA

BACKGROUND OF THE INVENTION

1. Field of the Invention

The present invention relates to an image processing system including an image reading apparatus, which optically reads an image illustrated in an original and generates image data of the read original, and an information terminal apparatus connected to a network.

2. Description of the Related Art

Conventionally, an image reading apparatus connected to a network has a so-called scanner function, which transmits data (hereinafter referred to as scan data, image data, or original data) generated by reading an original to an information terminal apparatus such as a personal computer (PC).

The scanner function includes a pull scan function and a push scan function. The pull scan function is a function that activates a scanner function of an image reading apparatus (i.e., a server) by an operation of an information terminal apparatus side (i.e., a client) and transmits scan data from the image reading apparatus to the image terminal apparatus.

The push scan function is a function that determines an information terminal apparatus (a client) to which scan data is to be transmitted through an operation of an image reading apparatus (a server) side and transmits scan data to the information terminal apparatus. Several techniques about the push scan function are discussed.

In the present invention, a push scan method, in which an event for informing a start desire of a scan operation from a server to a client is notified and a pull scan from the client based on the notification is performed, will be described.

Generally, in a network system including a plurality of clients and a server and communication between a certain client and the server is not occupied, there are two methods for recognizing an event notification from the server to a certain client.

One is a method in which the client performs polling to the server (a polling type push scan). That is, in a system including PCs (clients) and a multifunction peripheral (MFP) (a server), to detect an occurrence of an event in the MFP, each PC performs polling to the MFP.

More specifically, the PC issues a polling request to the MFP using user the datagram protocol (UDP) communication. The MFP stores list information of the PCs with which the MFP is communicating.

When a polling request event is generated from the PC, the MFP notifies the occurrence of the event to the PC (an event target) as a polling response thereto.

Consequently, the PC recognizes the event notification and requests the MFP to provide a service using transmission control protocol (TCP) communication. The technique is discussed in Japanese Patent Application Laid-Open No. 2007-219956.

The technique discussed in Japanese Patent Application Laid-Open No. 2007-219956 is the polling type push scan. Identification information such as a PC name and a log-on user name as destination information of scan data are included in various request packet frames transmitted from a client to a server. This method is complicated in operation, but the server can easily acquire client information.

The other is a method in which a server notifies all or a specific one of clients of an occurrence of an event (an event type push scan). That is, in a system including PCs as clients and an MFP as a server, the MFP notifies the PC of the occurrence of the event.

More specifically, the MFP itself notifies all PCs on a network of the occurrence of the event by using broadcasting based on UDP communication. Thereafter, a corresponding PC alone recognizes the notification of the event, and requests the MFP to provide a service using TCP communication.

Currently, in the event type push scan, the server commonly provides clients with services using a web service technique. In the web service technique, the server provides clients with files described in a web services description language (WSDL) using a simple object access protocol (SOAP).

The client interprets the service description information and recognizes which service can be provided from the server or in which procedure and with which protocol a service is provided.

Japanese Patent Application Laid-Open No. 2008-034923 discusses a technique for managing destination information of image data in the push scan of a web-service (WS) scanner system.

In Japanese Patent Application Laid-Open No. 2008-034923, in the event type push scan, when communication attempted based on destination information stored in an image reading apparatus fails, the destination information is invalidated.

However, unlike the polling type push scan discussed in Japanese Patent Application Laid-Open No. 2007-219956, in the event type push scan discussed in Japanese Patent Application Laid-Open No. 2008-034923, client information, which can be recognized by the server, is subjected to the limitation of a protocol.

For example, in the push scan (hereinafter, referred to as a WSD push scan) of a web services on devices (WSD) scan service, which is a protocol of a WINDOWS (registered trademark) VISTA, client PC information that can be recognized by the MFP as the server is only a PC name.

For this reason, there is a problem in that a user who operates the MFP can select a PC name as a data destination but cannot confirm a log-on user name.

Therefore, if a first user operates the MFP to perform the push scan for a PC when a second user has logged on the PC, there was a problem in that scan data of the first user may be erroneously transmitted to the second user.

SUMMARY OF THE INVENTION

The present invention is directed to an image processing system, an image processing apparatus, and a method for controlling an image processing system. More particularly, in an image processing system, an image processing apparatus and a method of controlling an image processing system in which a push scan method using a WSD protocol is employed, when a user selects a destination of scan data, a user can confirm and select a log-on user name, which has logged on a PC as well as a PC name. Therefore, the user can avoid erroneous transmission of scan data.

According to an aspect of the present invention, there is a provided an image processing system having an image processing mode in which image data of an original read by an image reading apparatus is transmitted to an information terminal apparatus on a network according to a communication protocol. The information terminal apparatus includes a first command issuing unit which generates a command including user identification information of the information terminal apparatus and issues the command to the image reading apparatus, in response to an operation start request command which is received from the image reading apparatus and requests an instruction of an original reading start. The image reading apparatus includes an acquisition unit which acquires information of a plurality of information terminal apparatuses connected according to the communication protocol, a display unit which displays the information of the plurality of information terminal apparatuses, a mode designation unit which designates the image processing mode, a selection unit which selects an information terminal apparatus, to which the image data is to be transmitted, from among the plurality of information terminal apparatuses displayed on the display unit, a second command issuing unit which issues the operation start request command to the selected information terminal apparatus, an image data generation unit which reads the original to generate the image data, and a transmission unit which transmits the image data to the information terminal apparatus selected by the selection unit. The acquisition unit issues the operation start request command to the plurality of information terminal apparatuses and acquires the user identification information from the command including the user identification information issued from the plurality of information terminal apparatuses through the first command issuing unit before the information terminal apparatus, to which the image data is to be transmitted, is selected by the selection unit after the image processing mode is designated by the mode designation unit, and the display unit reflects and displays the user identification information acquired by the acquisition unit on the display unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 illustrates an example (a PC name and a log-on name) of a destination selection screen displayed on an operation/display unit.

DESCRIPTION OF THE EMBODIMENTS

Various exemplary embodiments, features, and aspects of the invention will be described in detail below with reference to the drawings.

An exemplary embodiment of the present invention will be described in detail using an example of an image processing system that performs the push scan using the WSD protocol, which is one of communication protocols on a network.

Figure 1:
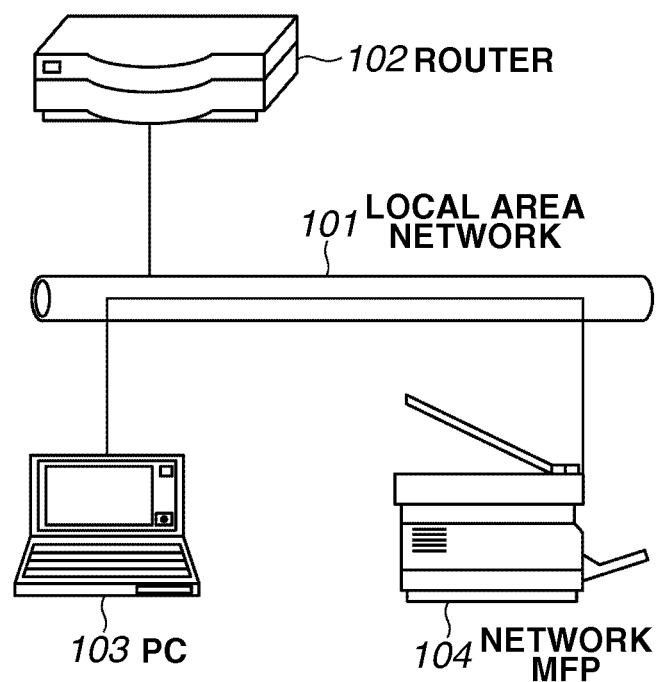
FIG. 1 illustrates a network reading environment.

FIG. 1 illustrates a network reading environment according to an exemplary embodiment of the present invention. A router 102, a PC 103 (an information terminal), and an MFP 104 (an image reading apparatus) connectable to a network are connected to a local area network (LAN) 101.

The router 102 is a communication mediation apparatus, which can perform communication using both IPv6 and IPv4 and is generally available, and can perform a resolution of an IP address within a connected network. The router 102 may have a wireless communication function, and in this case, it is called an access point.

In description of FIG. 1 or later, a network including the LAN 101 (a wire-line LAN cable) will be described. However, the present invention may be applied to a network including a wireless LAN and a network in which both a wired LAN and a wireless LAN are mixed.

In FIG. 1, only one PC is illustrated, but a plurality of PCs may be connected to the router 102. Further, one MFP 104 may be connected to a network, and a plurality of PCs connected using a WSD protocol may share one MFP 104 to perform printing and reading.

In the present exemplary embodiment, the PC 103 and the MFP 104 are allocated appropriate IP addresses by the router 102 and are configured to perform communication through the LAN 101.

Figure 2:
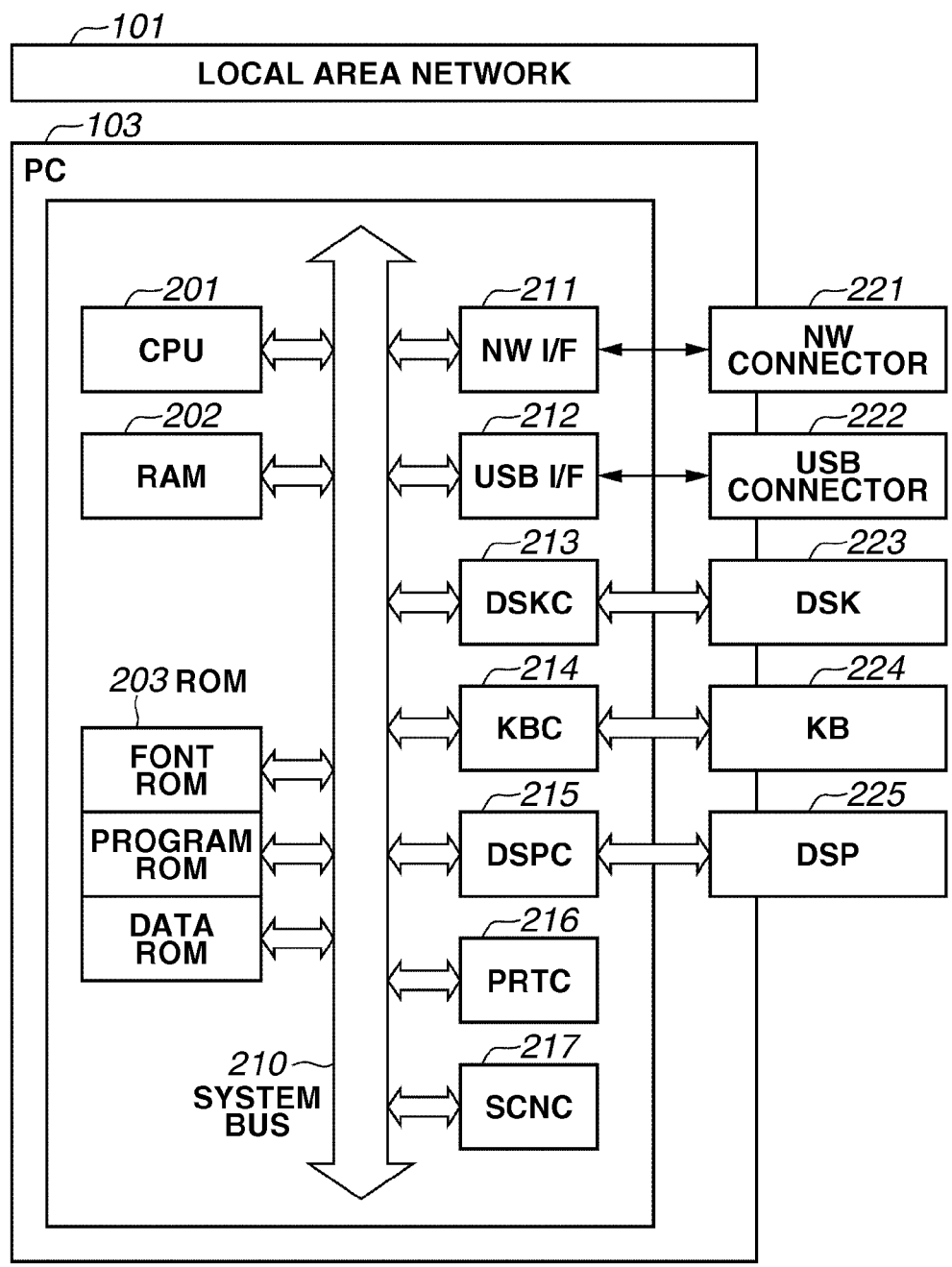
FIG. 2 is a block diagram illustrating a schematic physical configuration of a PC.

FIG. 2 is a block diagram illustrating a schematic physical configuration of the PC 103 according to an exemplary embodiment of the present invention.

A central processing unit (CPU) 201 processes a document including graphics, images, characters, and tables (including table calculation) based on a document processing program stored in a program read only memory (ROM) of a ROM 203 or an external memory (DSK) 213. The CPU 201 controls respective devices connected to a system bus 210 in general.

An operating system program (OS), which is a control program for the CPU 201, is stored in the program ROM of the ROM 203 or the DSK 223.

Font data to be used at the time of document processing is stored in a font ROM of the ROM 203 or the DSK 223. A variety of data used at the time of document processing is stored in a data ROM of the ROM 203 or the DSK 223.

A random access memory 202 functions as a main memory and a work area of the CPU 201. A disk controller (DKC) 213 controls access between the PC 103 and the DSK 223.

The DSK 223 stores a boot program, a variety of applications, font data, user files, edit files, and anMFP control command generating program (hereinafter, referred to as an MFP driver). The DSK 223 includes a hard disk (HD) or a flexible disk (FP).

A keyboard controller (KBC) 214 controls a key input from a keyboard (KB) 224 or a pointing device (not illustrated).

A display controller (DSPC) 215 controls display of a display (DSP) 225.

A printer controller (PRTC) 216 performs communication control processing for a printer, which is connected through a USB interface (I/F) 212, a USB connector 222, an NW I/F 211, or an NW connector 221.

A scanner controller (SRTC) 217 performs communication control processing for a scanner, which is connected through the USB I/F 212, the USB connector 222, the NW I/F 211, or the NW connector 221.

The USB I/F 212 can communicate with the MFP 104 through a USB cable (not illustrated) connected to the USB connector 222.

The NW I/F 211 can communicate with the MFP 104 through a wireless LAN card of a personal computer memory card international association (PCMCIA) card type (not illustrated) or a LAN cable, which is connected to the NW connector 221, via a network. The components used for a wireless LAN communication may be mounted in the PC.

The CPU 201 executes expansion (rasterization) processing of, for example, display information set in the random access memory (RAM) 202 into an outline font and makes "what you see is what you get (WYSIWYG)" on the display 225 possible. The CPU 201 opens a variety of registered windows or executes a variety of data processing based on a command instructed by a mouse cursor displayed on the DSP 225.

Therefore, when executing printing, the user may open a window for printing setting and set a printing processing method such as setting for a printing unit of the MFP 104 or selection of a printing mode to a printer driver.

Similarly, when executing reading, the user may open a window for reading and set a reading processing method such as setting for a reading unit of the MFP 104 or selection of a reading mode.

In general, in order to perform printing in an operating OS environment, the PC needs printing software (a printer driver) or reading software (a scanner driver) for performing reading. The printer driver and the scanner driver are provided from an OS maker or a printer maker, which is installed in the PC in advance or provided in the form of a compact disk (CD).

The printer driver and the scanner driver need to be installed to perform printing and reading by the printer, but in the present exemplary embodiment, it is assumed that the printer driver and the scanner driver have been already installed.

Figure 3:
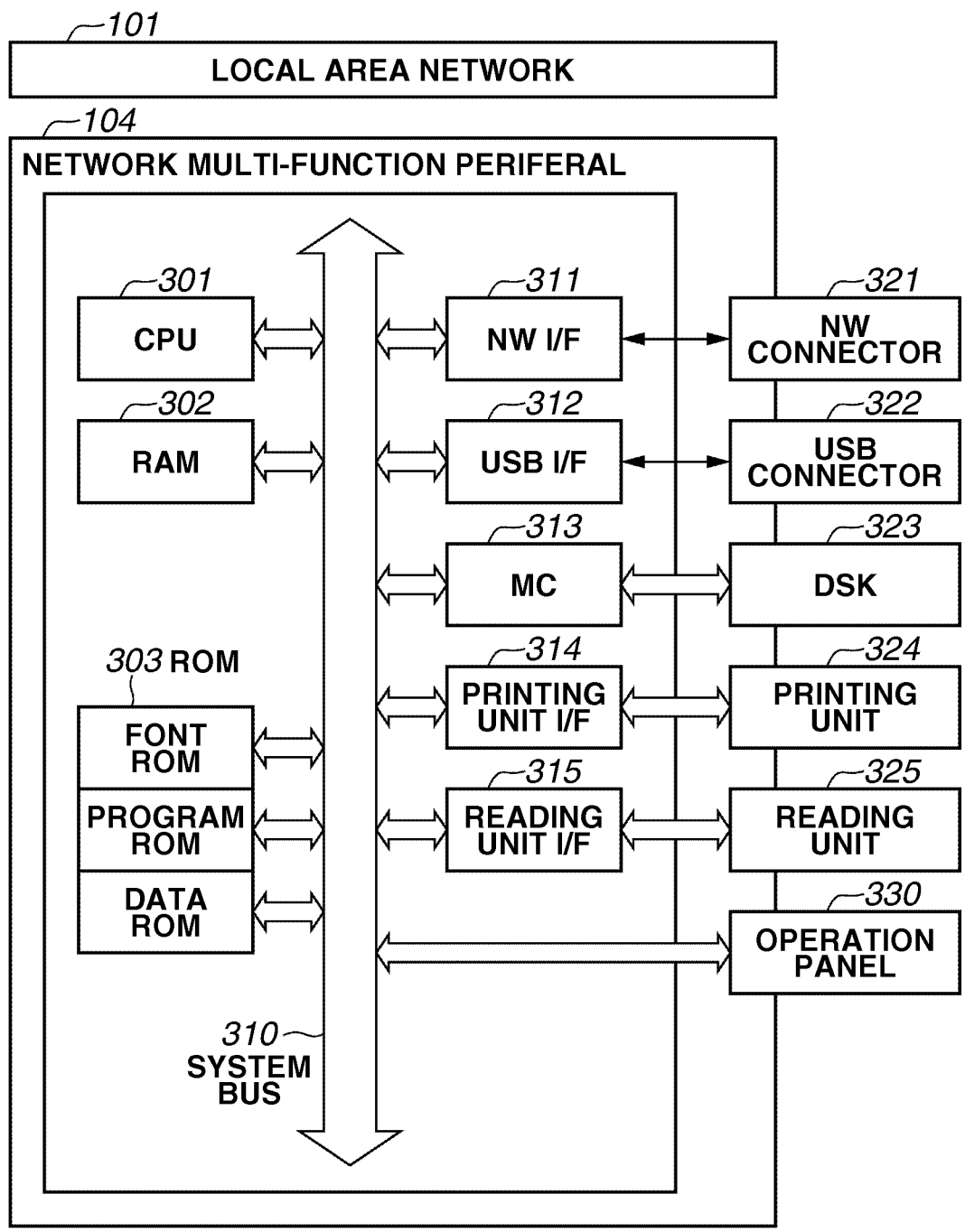
FIG. 3 is a block diagram illustrating a schematic physical configuration of a network MFP.

FIG. 3 is a block diagram illustrating a schematic physical configuration of the network MFP according to an exemplary embodiment of the present invention.

A MFP CPU 301 outputs an image signal through a printing unit I/F 314 as output information to a printing unit (a printer engine) 324 connected to a system bus 310. The CPU 301 receives an image signal through a reading unit I/F 315 as input information from a reading unit (a scanner engine) connected to the system bus 310.

The CPU 301 performs above-described processing based on a control program stored in a program ROM of a ROM 303 or a control program stored in a DSK 323. A reading unit 325 is connected to a platen (not illustrated) or a device equivalent thereto.

The control program of the CPU 301 is stored in the program ROM of the ROM 303. Font data to be used to generate the output information is stored in a font ROM of the ROM 303. Printer performance information and device identification information, which are used in the PC 103 when the MFP 104 does not use the DSK 323 such as a hard disk, are stored in a data ROM of the ROM 303.

The CPU 301 can notify information of the MFP 104 to the PC 103. A RAM 302 functions as a main memory and a work area for the CPU 301. The memory capacity of the RAM 302 can be extended by an optional memory connected to an expansion port (not illustrated).

An NW I/F 311 can communicate with the PC through a wireless LAN card of a PCMCIA card type (not illustrated) or a LAN cable, which is connected to the NW connector 321, via a network. The components used for a wireless LAN communication may be mounted in the MFP.

A USB I/F 312 communicates with the PC 103 through a USB cable (not illustrated) connected to the USB connector 322.

The RAM 302 is used as an output information rasterization area, an environment data storage area, and a temporary storage area of a variety of information of the MFP 104. Access to the DSK 323 (a hard disk (HD) or an integrated circuit (IC) card) is controlled by a memory controller (MC) 313.

The DSK 323 is connected as an option and stores font data, an emulation program, and form data. A switch and a light emitting diode (LED) indicator for operation are disposed on an operation panel 330.

Further, one or more DSKs 323 may be installed, and a plurality of external memories, in which an optional font card in addition to the built-in fonts and a program of interpreting an MFP control language having a different language system are stored, may be connected to the DSK 323.

A non-volatile RAM (NVRAM) (not illustrated) may be included to store MFP operation mode setting information input through the operation panel 330.

First, the push scan of the WSD scan service (hereinafter referred to as a WSD push scan) will be schematically described.

Figure 4:
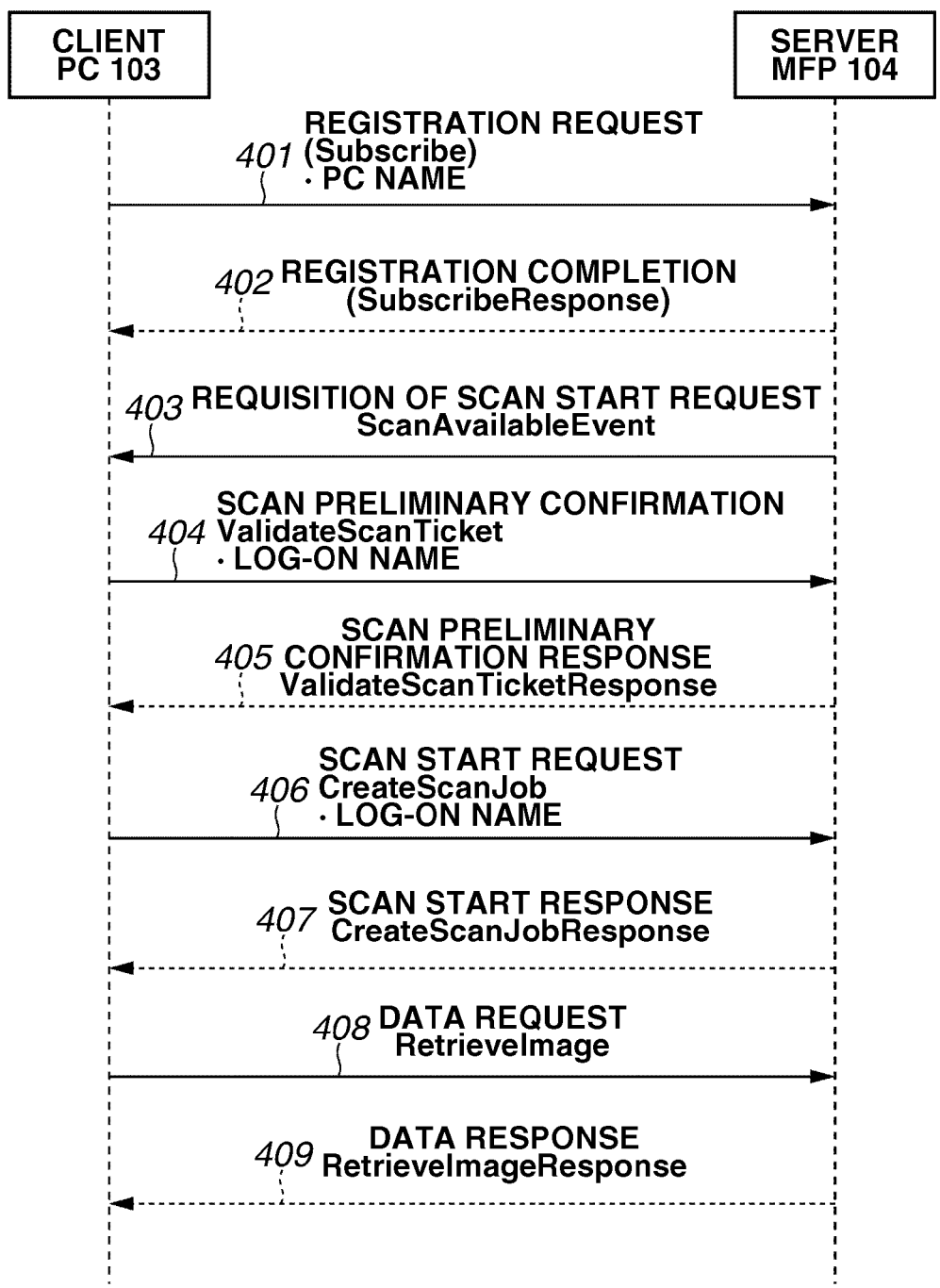
FIG. 4 is a sequence diagram illustrating a schematic sequence of a push scan of a WSD scan service.

FIG. 4 is a sequence diagram illustrating a schematic sequence of the WSD push scan.

In step S401, before using the WSD push scan, the client PC 103 transmits a registration request (Subscribe) to the server MFP 104 in advance. A PC name of the PC 103 is included in the registration request command, and the MFP 104 can recognize the PC name. The registration request command is issued when the PC 103 and the MFP 104 have been enabled to perform network communication.

In step S402, when the registration of the PC 103 is completed, the MFP 104 transmits a registration completion (SubscribeResponse) command to the PC 103. In this state, the PC 103 can use the WSD scan service provided by the MFP 104.

The user goes to a place where the MFP 104 is installed, and places, for example, a magazine as a scan target on a platen (not illustrated in FIG. 3) and presses a button on the operation panel 330 to execute the push scan. In step S403, when the button is pressed, the MFP 104 issues a request (ScanAvailableEvent) command of a scan start request to the PC 103.

When the request command of the scan start request is received, the PC 103 issues a scan preliminary confirmation (ValidateScanTicket) command to the MFP 104. In step S404, a combination of scan parameters expected by the PC 103 and a log-on user name which is logging on the PC 103 are included in the command.

The MFP 104 checks whether the scan can be performed, based on information included in the scan preliminary confirmation command. When the scan is possible, the MFP 104 transmits an OK response using a scan preliminary confirmation response (ValidateScanTicketResponse) command. In step S405, when the scan is impossible, the MFP 104 transmits a no good (NG) response.

In step S406, the PC 103, which has received the OK response in step S405, issues a scan start request (CreateScanJob) command. A log-on user name, which is logging on the PC 103, is included in the scan start request command. The PC 103 which has received the NG response in step S405 stops processing of step S406 or subsequent processing, so that the scan is not executed.

In step S407, the MFP 104, which has received the scan start request, transmits a scan start response (CreateScanJobResponse) command when it is in a state in which the scan can be started.

Thereafter, in step S408, the PC 103 issues a data request (RetrieveImage) command to the MFP 104.

In step S409, the MFP 104 transmits a data response (RetrieveImageResponse) command and transmits scan data to the PC 103.

Figure 5:
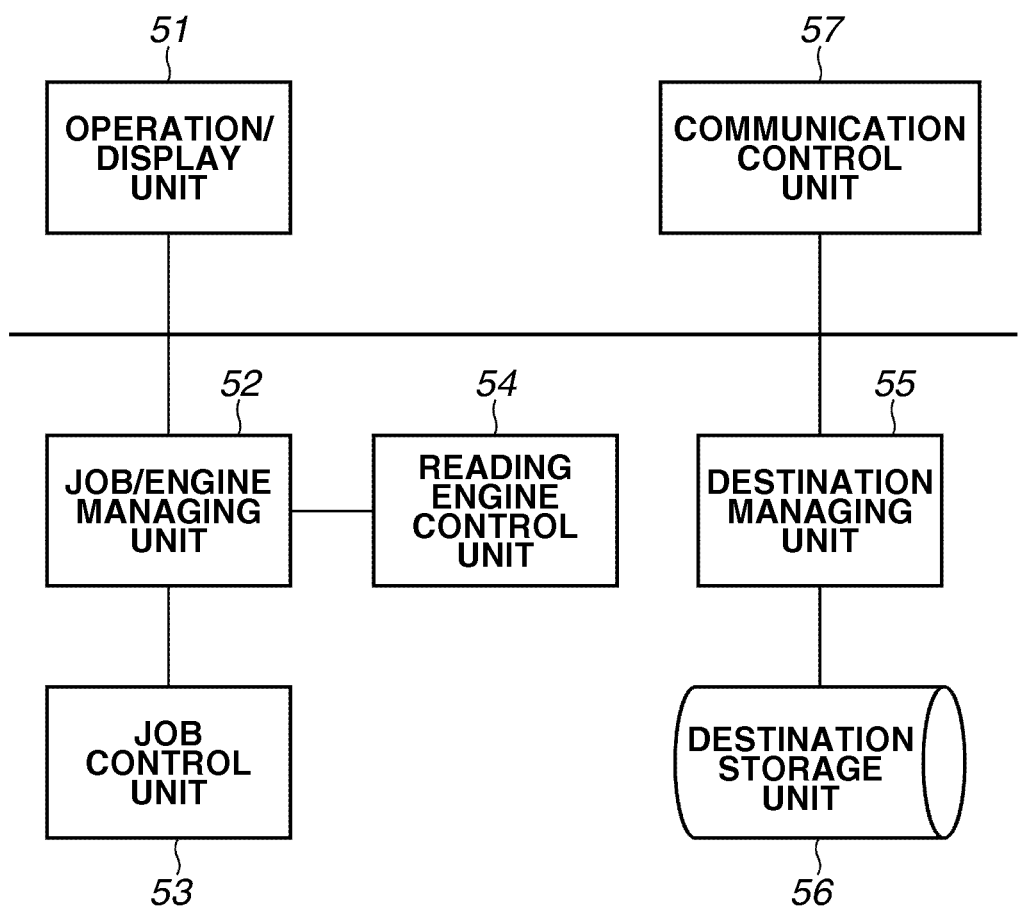
FIG. 5 is a block diagram illustrating a schematic logical configuration of a network MFP.

FIG. 5 is a block diagram illustrating a schematic logical configuration of the network MFP according to an exemplary embodiment of the present invention. The operation panel 330 illustrated in FIG. 3 performs a function of an operation/display unit 51 illustrated in FIG. 5. The operation/display unit 51 includes a scan mode designation button for designating a scan mode, which is an image processing mode to which the present exemplary embodiment is applied, a destination display button, a push scan mode execution start button, and a display screen for displaying a variety of information.

The scan mode transition button is a button that is used for changing the image processing mode to the push scan execution mode. The destination display button is a button used for displaying a destination of the push scan on the display screen. The push scan mode execution start button is a button used for instructing a transmission start of image data generated by the scan.

The CPU 301, the RAM 302, and the ROM 303 perform respective functions of a job/engine managing unit 52, a job control unit 53, an engine control unit 54, a destination managing unit 55, and a destination storage unit 56. The NW I/F 311 performs a function of a communication control unit 57.

The job/engine managing unit 52 can communicate with the job control unit 53 and the engine control unit 54 and manages an overall scan operation including grasping the capability of a reading engine of the MFP 104.

The job control unit 53 controls a job executed in the MFP 104 and performs, for example, control, for the scan operation, of exclusively occupying a relevant resource of the MFP 104 for the scan.

The engine control unit 54 can communicate with the reading unit 325 through the reading unit I/F 314 and controls scan data creation. The communication control unit 57 mediates network communication with the PC 103 in general.

Figure 6:
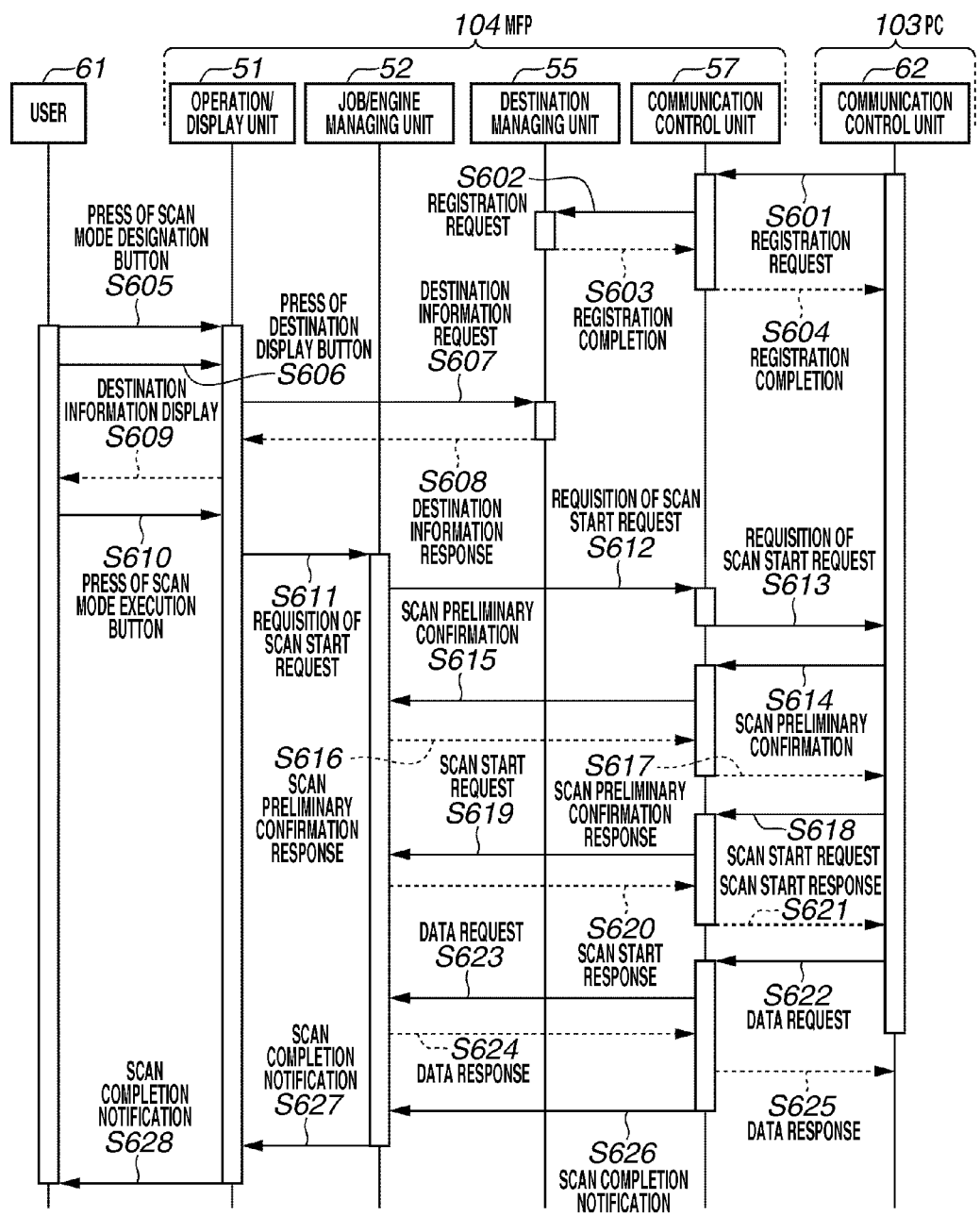
FIG. 6 is a sequence diagram illustrating a basic sequence of a push scan of a WSD scan service.

FIG. 6 is a sequence diagram illustrating a basic sequence of the WSD push scan.

Figure 7:
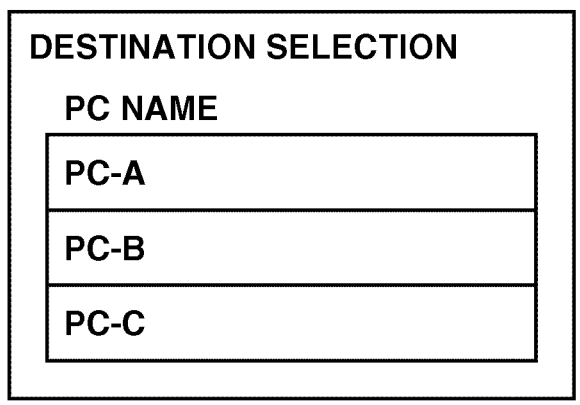
FIG. 7 illustrates an example (only a PC name) of a destination selection screen displayed on an operation/display unit.

FIG. 7 illustrates an example (only a PC name) of a destination selection screen displayed on the operation/display unit 51.

Referring to FIG. 6, the operation is described using the operation/display unit 51, the job/engine managing unit 52, the destination managing unit 55, and the communication control unit 57, which are illustrated in FIG. 5, a user 61 who operates the operation/display unit 51, and a communication control unit 62, which is implemented by the NW I/F 211 of the PC 103.

In the present exemplary embodiment, three PCs of PC-A, PC-B, and PC-C are connected to the MFP 104 and have completed the registration thereto, respectively. In an exemplary embodiment described below, PC-A is described as the PC 103.

A log-on user name of PC-A is Taro, a log-on user name of PC-B is Jiro, and a log-on user name of PC-C is Saburo. Taro is described as the user 61.

First, the user 61 checks network wiring and turns on power to each of the MFP 104 and the PC 103. In step S601, when NW communication is established between the MFP 104 and the PC 103, the PC 103 issues a registration request to the MFP 104 through the communication control unit 62 of the PC 103 (hereinafter, referred to as the PC 103).

In step S602, the registration request command is received by the communication control unit 57 of the MFP 104 and transmitted to the destination managing unit 55.

As described above with reference to FIG. 4, the PC name of the PC 103 as destination information is included in the registration request command. The destination managing unit 55 stores destination information in the destination storage unit 56. At this time, a PC name and an IP address are registered as PC information associated with each other. In steps S603 and S604, when the registration of PC information is completed, the destination managing unit 55 notifies registration completion to the PC 103.

Subsequently, in step S605, the user 61 operates the operation/display unit 51 and presses the scan mode designation button to execute the push scan. The operation/display unit 51 displays a scan operation screen.

In steps S606 and S607, the user 61 presses the destination display button of the operation/display unit 51, so that the destination information request command is notified to the destination managing unit 55.

In steps S608 and S609, the destination managing unit 55 acquires destination information from the destination storage unit 56 and displays destination information in the form, which can be discriminated by the user. At this time, since the destination storage unit 56 stores only PC name information, PC name information is displayed on the display screen of the operation/display unit 51 as illustrated in FIG. 7.

Further, in steps S610 to S613, when the user 61 operates the operation/display unit 51 to select "PC-A" as a destination PC and presses the scan mode execution button, as image processing, in the case of the present exemplary embodiment, a requisition of a scan operation start request is notified to the PC 103.

In steps S614 and S615, the PC 103, which has received the requisition of the scan start request, issues a scan preliminary confirmation command and checks whether the scan can be performed using a desired parameter. A log-on user name, which is logging on the PC 103, is included in the scan preliminary confirmation command as described above, and the MFP 104 can recognize that the log-on user name of the PC 103 is "Taro" for the first time.

In steps S616 and S617, the job/engine managing unit 52, which has received the scan preliminary confirmation command, determines whether the scan can be performed with a requested parameter. OK is responded to the PC 103 when the scan is possible, while NG is responded to the PC 103 when the scan is impossible.

In steps S618 and S619, when OK is received as the scan preliminary confirmation response, the PC 103 issues a scan start request command. The log-on user name, i.e., Taro, as user identification information of the PC 103 is included in the scan start request command. When NG is received as the scan preliminary confirmation response, subsequent processing is stopped, and the scan is not performed.

The job/engine managing unit 52, which has received the scan start request command, acquires an operation state of the MFP 104 from the job control unit 53 and determines whether the scan operation is possible.

In steps S620 and S621, when the scan is possible, an attempt for exclusively occupying the reading engine control unit 54 for a scan job designated by the scan start request is made. When the exclusive occupation is successful, since scan operation can be continuously performed, OK is responded to the PC 103, while when the scan operation is not possible, NG is responded to the PC 103.

In steps S622 and S623, when OK is received as the scan start response, the PC 103 issues a data request command to request the MFP 104 to provide scan data. When NG is received as the scan start response, subsequent processing is stopped, and the scan is not performed.

In steps S624 and S625, the job/engine managing unit 52, which has received the scan data request, requests the reading engine control unit 54 to create scan data and sequentially transmits created scan data to the PC 103.

In the present exemplary embodiment, scan data is sequentially transmitted, but when the scan start request or the data request is received, scan data corresponding to one page may be created and transmitted to the PC 103 at a time. However, this departs from the spirit and scope of the present invention and, thus description on that is omitted.

In steps S626 and S627, when data is completely transmitted to the PC 103, the communication control unit 57 notifies scan completion to the operation/display unit 51 through the job/engine managing unit 52.

In step S628, the operation/display unit 51 displays the scan completion in the form, which can be discriminated by the user. However, in the above-described sequence, erroneous transmission may be made as will be described below.

In general, the user 61 and the log-on user of the PC 103 are the same person. More specifically, Taro logs on the PC 103 and confirms that the PC 103 and the MFP 104 can communicate with each other via a network. Thereafter, Taro goes to the MFP 104 with a magazine or other document, which Taro desires to scan, and operates the push scan operation.

However, there may occur a case in which before Taro presses the scan mode transition button of the operation/display unit 51 of the MFP 104 in steps S605, a different user, for example, Hanako, logs on the PC 103. In this case, scan data, which Taro desired to transmit to himself, is erroneously transmitted to Hanako.

Further, there is a case in which alphanumeric characters are allocated as the PC name to manage a plurality of PCs on a ledger. For example, let us assume that a character string of "ASDF-293849" is allocated as the PC name. In this situation, when a PC name of a similar character or number string such as "ASDF-293649" as a different PC name is displayed on the operation/display unit 51, it is not easy to discriminate the two PC names, and thus erroneous transmission may be made.

A sequence according to the present invention to avoid erroneous transmission will be described.

Figure 8:
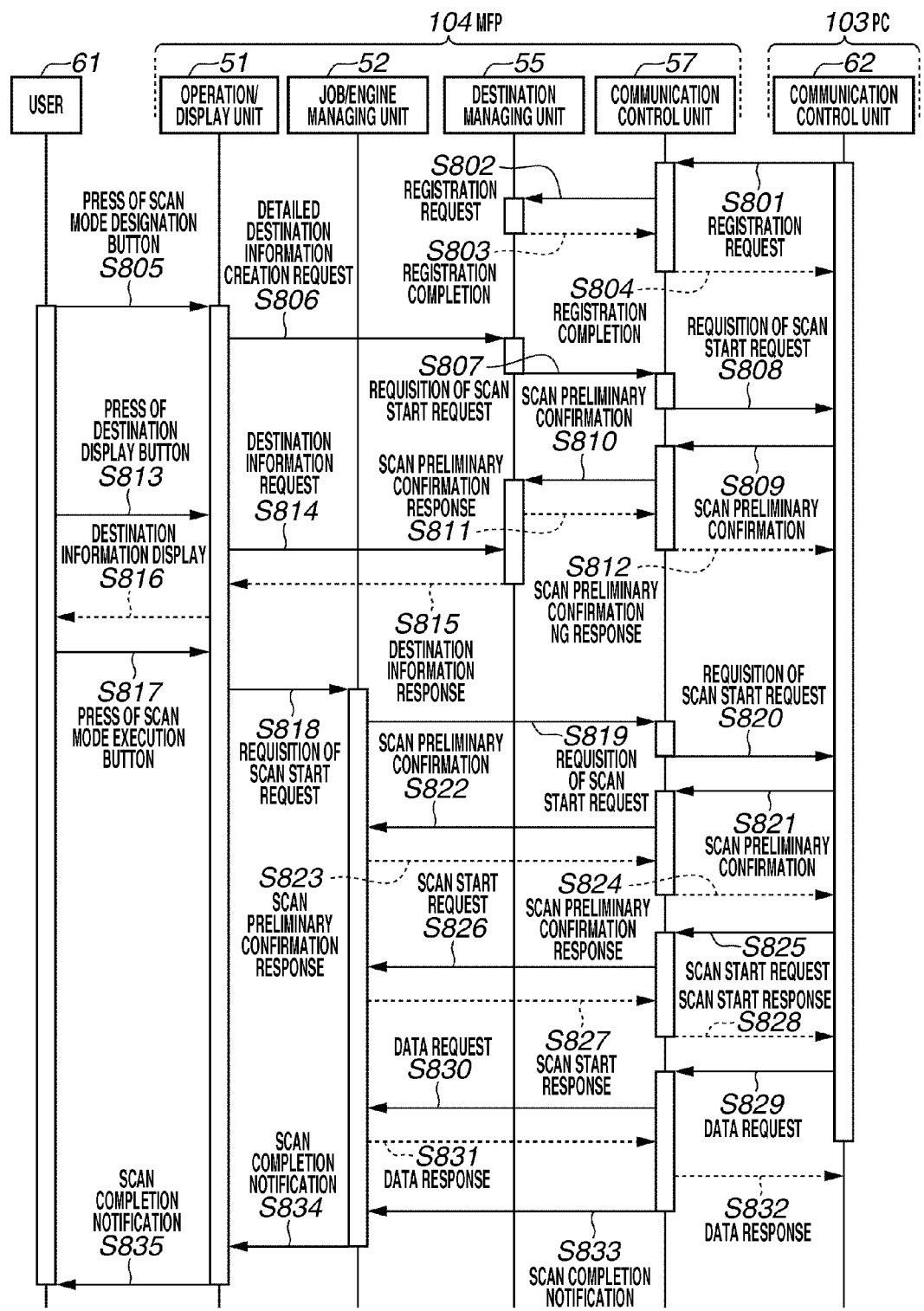
FIG. 8 is a sequence diagram illustrating a sequence of a push scan of a WSD scan service according to an exemplary embodiment of the present invention.

FIG. 8 is a sequence diagram illustrating a sequence of the WSD push scan according to an exemplary embodiment of the present invention.

FIG. 9 illustrates an example (a PC name and a log-on name) of a destination selection screen displayed on the operation/display unit 51. Referring to FIG. 8, characteristic portions compared to FIG. 6 will be described below.

First, in steps S801 to S804, the PC 103 completes the registration to the MFP 104. This is identical to the processing of from steps S601 to S604.

Next, in step S805, the user 61 operates the operation/display unit 51 and presses the scan mode transition button to execute the push scan. The operation/display unit 51 displays the scan operation screen. This is identical to the processing of step S605, but a subsequent sequence is different from the sequence of FIG. 6.

First, in step S806 when the scan mode designation button is pressed, the operation/display unit 51 issues a detailed destination information creation request to the destination managing unit 55.

In steps S807 and S808, the destination managing unit 55 issues a request command of a scan operation start request to a PC, which is stored in the destination storage unit 56. The request command of the scan operation start request is regularized and is the same command as that used in step S613 or S820, which will be described later.

In steps S809 and S810, the PC 103, which has received the requisition of the scan operation start request, issues a scan preliminary confirmation command and checks whether the scan can be performed using a desired parameter.

The log-on user name as user identification information of the PC 103 is included in the scan preliminary confirmation command as described above. Therefore, the MFP 104 can recognize that the log-on user name of the PC 103 is "Taro" for the first time. The destination managing unit 55 additionally stores the log-on user name "Taro" in association with corresponding PC information like "PC-A Taro".

In steps S811 and S812, the job/engine managing unit 52, which has received the scan preliminary confirmation command, transmits a rejection response (an NG response) indicating that the scan operation start is impossible to the PC 103 without determining whether the scan can be performed with a requested parameter.

Since the PC 103 receives NG as a scan preliminary confirmation response, subsequent commands including a scan start response command are not issued, and thus the scan is not performed.

In steps S813 and S814, the user 61 presses the scan mode designation button of step S805 and presses the destination display button of the operation/display unit 51, so that a destination information request command is notified to the destination managing unit 55.

In steps S815 and S816, the destination managing unit 55 acquires destination information from the destination storage unit 56 and displays destination information in the form, which can be discriminated by the user. At this time, since the destination storage unit 56 stores the log-on user name as well as the PC name, destination information in which the log-on user name is reflected is displayed on the display screen of the operation/display unit 51 as illustrated in FIG. 9.

Therefore, the user 61 can confirm the log-on user name as well as the PC name and thus can select a correct destination.

Further, in steps S817 to S820, when the user 61 operates the operation/display unit 51 to select "PC-A Taro" as a destination PC and presses the scan mode execution button, a requisition of a scan operation start request is notified to the PC 103. This is identical to the processing of from steps S610 to S613. The request command of the scan start request in step S820 is equivalent to that used in step S808.

Thereafter, in steps S821 to S835, a scan preliminary confirmation and response, a scan start request and response, a data request and response, and scan completion are notified, and the push scan is completed. This is identical to the processing of from steps S614 to S628.

Here, there may occur a case in which before Taro presses the scan mode designation button of the operation/display unit 51 of the MFP 104 in step S805, a different user, for example, Hanako, logs on the PC 103.

As described above, when Taro presses the destination display button of the operation/display unit 51, the request command of the scan start request is notified to the PC 103 in steps S805 to S808, and the scan preliminary confirmation command is notified to the destination managing unit 55 in steps S809 and S810.

Since "Hanako" as the log-on user name of the PC 103 is included in the scan preliminary confirmation command, the destination storage unit 56 stores "PC-A" and "Hanako" in association with each other.

Thereafter, in steps S814 and S815, when Taro presses the destination display button of the operation/display unit 51, the destination managing unit 55 transmits "PC-A Hanako" as the destination information response.

Since "PC-A Hanako" is displayed on the display screen of the operation/display unit 51, Taro is aware of that the log-on user of the destination PC is not himself and thus can avoid erroneous transmission.

The present invention is not limited to the exemplary embodiments described above, and exemplary embodiments described below can be implemented without departing from the spirit and scope of the present invention.

When the MFP 104 is connected to a plurality of PCs, the request command of the scan start request is issued to the plurality of PCs in steps S807 and S808. In this case, before a series of processing in steps S809 to S812 for acquiring the log-on user name is completed, the user 61 may press the destination display button of the operation/display unit 51 in steps S813 to S814.

The destination managing unit 55 of the MFP 104 may transmit latest information at a point of time when the destination information request of step S814 is received to the operation/display unit 51 to manage the situation. Alternatively, the destination managing unit 55 may delay the destination information response in step S815 to be transmitted to the operation/display unit 51 until processing, which is performed in steps S810 and S811, of acquiring long-on user names from all of connected PCs is completed.

In the MFP 104, the log-on user name acquired from the scan preliminary confirmation command of step S822 may be temporarily stored in the job/engine managing unit 52 and thereafter compared with the log-on user name included in the scan start request command received in step S826.

When the two log-on user names are different, the operation/display unit 51 may be updated with the log-on user name included in the scan start request command received in step S826, and the user 61 may be inquired about whether to continue scan processing.

A processing continuing button for continuing scan processing and a stop button for stopping scan processing may be disposed on the operation/display unit 51 so that the user 61 may select/instruct about whether to continue processing.

In the MFP 104, the destination managing unit 55 itself may issue the request command of the scan start request for acquiring the log-on user name at a regular interval.

Alternatively, the job/engine managing unit 52 may instruct the destination managing unit 55 to issue the request command of the scan start request for acquiring the log-on user name when it is determined that the MFP 104 is in an idle state. Thereby, the destination managing unit 55 can maintain destination information up to date.

In the MFP 104, timing in which the operation/display unit 51 issues the detailed destination information creation request command may be changed to timing in which the user 61 presses the destination display button of the operation/display unit 51.

In other words, in steps S807 to S812, the destination information request of step S814 may double as the detailed destination information creation request of step S806 so that log-on user name acquisition processing may be performed between the destination information request of step S814 and the destination information response of step S815.

In any case, the operation/display unit 51 displays the log-on user name on the destination selection screen displayed to the user 61 to thereby achieve the object of the present invention.

As described above, in description of the present exemplary embodiment, the destination managing unit 55 acquires the log-on user name (hereinafter, referred to as a preliminary confirmation user name) included in the scan preliminary confirmation command. However, the destination managing unit 55 may acquire the log-on user name (hereinafter, referred to as a start request user name) included in the scan start request command.

In this case, OK is transmitted as the scan preliminary confirmation response in steps S811 and S812, so that the PC 103 subsequently issues the scan start request command. The destination managing unit 55 acquires "the start request user name" from the scan start request command and transmits NG as the scan start response to the PC 103. As a result, scan processing requested from the PC 103 is stopped. Above-described processing is performed directly after step S812.

The destination managing unit 55, which has received the destination information request command in step S814, transmits "the start request user name" acquired as described above as the destination information response of step S815. Thereby, the similar effect to that in the above-described exemplary embodiment is obtained.

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-294595 filed Nov. 18, 2008, which is hereby incorporated by reference herein in its entirety.

What is claimed is:

1. An image reading apparatus comprising:
an accepting unit configured to accept a user's instruction;
a first sending unit configured to send a requisition of a first reading start request to a destination apparatus for sending read image data read by the image reading apparatus under a Web Services on Devices (WSD) protocol in a case where a user's instruction for using an image reading function of the image reading apparatus is accepted by the accepting unit;
a first responding unit configured to transmit a confirmation NG response to a reading preliminary confirmation sent from the destination apparatus as a response to the first requisition of the reading start request sent by the first sending unit under the WSD protocol even if the image reading function is available:
an acquiring unit configured to acquire, from the destination apparatus, user identification information corresponding to a user who is currently logged-on to the destination apparatus as a response of to the first requisition of the reading start request sent by the first sending unit under the WSD protocol;
a notifying unit configured to notify a user of the user identification information acquired by the acquiring unit;
a second sending unit configured to send a second requisition of a reading start request to the destination apparatus under the WSD protocol after the user identification is notified by the notifying unit to the user and a user's instruction for executing the image reading function of the image reading apparatus is accepted by the accepting unit; and
a second responding unit configured to transmit a confirmation response to a reading preliminary confirmation sent from the destination apparatus as a response to the second requisition of the reading start request sent by the second sending unit under the WSD protocol if the image reading function is available; and
a third sending unit configured to send read image data obtained by reading an image by the image reading apparatus to the destination apparatus as a response to a data request which is issued by the destination apparatus in accordance with the requisition of the reading start request sent by the second sending unit confirmation response transmitted by the second responding unit.

2. The image reading apparatus according to claim 1, wherein the acquiring unit acquires a log-on name of the destination apparatus as the user identification information.

3. The image reading apparatus according to claim 1, wherein the acquiring unit acquires a plurality of pieces of the user identification information corresponding to a plurality of users from a plurality of destination apparatuses, and the notifying unit notifies the plurality of pieces of user identification information.

4. The image reading apparatus according to claim 3, wherein the second sending unit sends the first requisition of the reading start request to the destination apparatus corresponding to the user identification information which is selected from the plurality of pieces of the user identification information notified by the notifying unit.

5. The image reading apparatus according to claim 1, wherein the notifying unit notifies the user identification information by displaying the user identification information on a display unit.

6. The image reading apparatus according to claim 1, further comprising a registration unit configured to register the destination apparatus before the accepting unit accepts the user's instruction for using an image reading function of the image reading apparatus, wherein the first sending unit sends the first requisition of the reading start request to the destination apparatus registered by the registration unit.

7. The image reading apparatus according to claim 1, wherein the notifying unit notifies the user identification information with destination apparatus information for specifying the destination apparatus.

8. An image reading method between an image reading apparatus for reading an image and a destination apparatus for receiving read image data obtained by reading the image by the image reading apparatus, the method comprising:
sending, by the image reading apparatus, a first requisition of a reading start request to the destination apparatus under a Web Services on Devices (WSD) protocol in a case where the image reading apparatus accepts a user's instruction for using an image reading function of the image reading apparatus;
sending, by the destination apparatus, a first reading preliminary confirmation as a response to the sent first requisition of the reading start request under the WSD protocol;
transmitting, by the image reading apparatus, a confirmation NG response to the sent first reading preliminary confirmation from the destination apparatus under the WSD protocol even if the image reading function of the image reading apparatus is available;
sending, by the destination apparatus, user identification information corresponding to a user who is currently logged-on to the destination apparatus to the image reading apparatus as a response of to the sent first requisition of the reading start request under the WSD protocol;
notifying, by the image reading apparatus, a user of the sent user identification information;
sending, by the image reading apparatus to the destination apparatus, a second requisition of the reading start request to the destination apparatus under the WSD protocol after the user identification is notified by the image reading apparatus to the user and a user's instruction for executing the image reading function of the image reading apparatus is accepted by the image reading apparatus;
sending, by the destination apparatus, a second reading preliminary confirmation as a response to the sent second requisition of the reading start request under the WSD protocol;
transmitting, by the image reading apparatus, a confirmation response to the sent second reading preliminary confirmation from the destination apparatus under the WSD protocol if the image reading function of the image reading apparatus is available;
sending, by the destination apparatus to the image reading apparatus, a data request as a response to the sent second requisition of the reading start request transmitted the confirmation response;
sending, by the image reading apparatus to the destination apparatus, read image data obtained by reading an image by the image reading apparatus as a response to the sent data request.

9. The method according to claim 8, wherein the acquired user identification information is a log-on user name.

10. The method according to claim 8, wherein the user identification information is notified by displaying the user identification information on a display unit.

11. The method according to claim 8, further comprising registering the destination apparatus before the user's instruction is accepted for using an image reading function of the image reading apparatus, wherein the first requisition of the reading start request is sent to the registered destination apparatus.

12. A non-transitory computer-readable storage medium storing computer-executable program for performing a method of controlling an image reading apparatus, the method comprising:

sending a first requisition of a reading start request to a destination apparatus for sending read image data read by the image reading apparatus under a Web Services on Devices (WSD) protocol in a case where a user's instruction for using an image reading function of the image reading apparatus is accepted by the image reading apparatus;

transmitting a confirmation NG response to a reading preliminary confirmation sent from the destination apparatus as a response to the sent first requisition of the reading start request unit under the WSD protocol even if the image reading function of the image reading apparatus is available;

acquiring user identification information corresponding to a user the destination apparatus as a response of to the sent first requisition of the reading start request under the WSD protocol;

notifying a user of the acquired user identification information;

sending a second requisition of a reading start request to the destination apparatus under the WSD protocol after the user identification is notified to the user by the image reading apparatus and a user's instruction for executing the image reading function of the image reading apparatus is accepted by the image reading apparatus; and transmitting a confirmation response to a reading preliminary confirmation sent from the destination apparatus as a response to the sent second requisition of the reading start request under the WSD protocol if the image reading function is available; and sending read image data obtained by reading an image by the image reading apparatus to the destination apparatus as a response to a data request which is issued by the destination apparatus in accordance with the sent second requisition of the reading start request transmitted confirmation response.

* * * * *